Patented Nov. 14, 1939

2,179,487

UNITED STATES PATENT OFFICE 2,179,487

ABRASIVE ARTICLE

Raymond C. Benner and Norman P. Robie, Niagara Falls, N. Y., assignors to The Carborundum Company, Niagara Falls, N. Y., a corporation of Delaware No Drawing. Application October 29, 1937, Serial No. 171,758. Renewed March 20, 1939

3 Claims. (Cl. 51—280)

This invention relates to the production of abrasive articles and more particularly to the production of abrasive articles made with a resinous product containing lignin or a derivative of the same.

The term "lignin" is used as a generic name for certain substances occurring in wood, which consists principally of cellulose and lignin, other materials such as sugars, gums, proteins and resins being also present in wood but in minor amounts. The exact chemical structure of lignin is not known, nor is it certain whether lignin is a definite chemical compound or a mixture of compounds, but it is known that it contains certain constituent radicals such as methyl, acetyl and hydroxyl radicals and that it will react chemically with resin-forming ingredients to form resinous materials.

Lignin is available commercially in large quantities as a by-product of the paper industry. One form of commercial lignin is known as "black liquor" which is a by-product of the sulphite method of making paper, the lignin of black liquor being in the form of a compound which is water soluble.

It is known that lignin and compounds of lignin can be reacted with certain chemicals to form resins. For example, bodies containing the hydroxyl group, such as phenols, and also aldehydic bodies such as formaldehyde, furfural, and hexomethylenetetramine, react with these lignin materials. By suitably combining the lignin-containing materials with condensation products of phenolic bodies and methylene-containing compounds and effecting reaction with the aid of a catalyst, fusible but heat-hardenable resins are obtainable.

The term "lignin resins" as hereinafter employed is meant to include the compositions derived from lignin-containing materials whether or not such compositions also include additional resinous material such as the reaction product of a phenol and an aldehyde.

Abrasive coated products have heretofore been largely made with the aid of glue as the bond for attaching abrasive grains to a backing. Likewise, various heat hardenable phenolic resins have been used to make coated abrasive articles such as sander discs. While these phenolic resin adhesives make excellent abrasive paper, they have the disadvantage of being more expensive than glue. Further, it has been necessary to use either normally liquid phenolic resins which are not easily adjusted for viscosity and adhesiveness, or it has been necessary to use solvents to dissolve solid heat hardenable phenolic resin which is a more expensive and hazardous method of forming a liquid adhesive.

Having in mind these defects, it is an object of our invention to provide a phenolic resinous adhesive which is as cheap or cheaper than the high quality animal glues used in the coated abrasive industry.

Another object of the invention is to provide, in a liquid phenolic resin adhesive for coated abrasives, a means of adjusting its viscosity, adhesiveness and cost by the addition of a relatively inexpensive lignin product.

A still further object of our invention is to provide, in a liquid phenolic resin adhesive for coated abrasives, a means of making it air setting or air hardening at room temperature before heat curing and hardening.

Another object of the invention is to provide abrasive articles comprising a lignin resin and methods of making the articles.

According to one embodiment of our invention, we incorporate with phenol resin raw materials either before or after reaction to the A stage, lignin or a lignin product, and use this resinous adhesive to bond abrasive grains to backings or to each other.

This may best be illustrated by the following specific examples:

Example I

In this example, the crude lignin product used in making the resinous lignin adhesive, is a dark brown fine granular material obtained from processing the waste sulfite liquor of the sulfite pulp process for making paper. It is a basic calcium salt of lignin sulphonic acid which is alkaline with caustic lime and has a pH of around 11. This material swells in boiling water and apparently goes into solution when the swollen material is mixed with certain liquid phenolic resins. The coating adhesive for 80 mesh fused alumina abrasive paper is made as follows:

8 pts. above lignin product is swollen in
16 pts. boiling water while stirring.
16 pts. of an "A" stage liquid phenolic resin is mixed into the swollen lignin product and
4 pts. "A" stage phenolic resin powder are carefully mixed in the mixture, care being taken to prevent the formation of lumps.

The above mixture is heated, while stirring, to 135° F. to give an adhesive solution. The wet adhesive is applied to 130 lb. cylinder paper at the rate of 4 lbs. per ream and 23 lbs. of 80 mesh fused alumina are uniformly distributed thereon by electrostatic means. The abrasive-adhesive coating hardens by air drying sufficiently to permit sizing without a heat cure. The abrasive coating is then sized by 11 lbs. per ream of an adhesive consisting of 80 pts. of the above coating adhesive and 20 pts. water. The coated paper is then heat hardened by curing 2½ hours at 125° F.
1½ hours at 250° F.
1¼ hours at 250° F.
6 hours at 300° F.

Very high grade efficient abrasive paper is produced.

Example II

The lignin product used in this example is a yellowish, finely powdered water soluble material which is commonly used as a temporary binder in the manufacture of ceramic articles. It is the evaporated by-product of the sulphite pulp process. It is composed of a soluble calcium salt of lignin sulphonic acid, sugars, degradation products, wood resins and other water soluble materials removed by the sulphite process of refining pulp. A typical analysis of this material is:

|  | Per cent |
|---|---|
| Ash | 6.00 |
| Total organic and volatile matter | 94.00 |
| CaO | 2.34 |
| MgO | 2.12 |
| Fe | 0.015 |
| Alkalies as $Na_2O$ | 0.05 |

The amount of CaO, MgO and other constituents may vary within a few per cent depending upon the source of the material. The cost of this lignin product is about 2½¢ per pound.

A coating adhesive for coating 80 grit fused alumina on 130 lb. cylinder paper is made with this lignin product as follows:

14 pts. above finely powdered lignin product are mixed with
36 pts. "A" stage liquid phenol-furfural resin having about 35% volatiles. Fresh thin water-miscible liquid resin is preferred to old thick liquid resin.

This mixture is heated to 135° F. for a short period, to give a uniform sticky liquid adhesive which is applied to the backing at 120° F. at the rate of 4½ lbs. per ream of wet adhesive. Fused alumina, 80 mesh size, is distributed uniformly over this adhesive in a manner common in the abrasive industry. The adhesive sets up or air dries at room temperature after which the article is sized with 7 lbs. per ream of a cold liquid resin solution composed of:

1 pt. liquid "A" stage phenolic resin (35% volatiles)
1 pt. water

The coating is cured as follows:

Approximately 16 hours (overnight) at 190° F.
3 hrs. at 225
5¼ hrs. at 275

This makes an excellent, efficient abrasive paper.

Example III

Lignin may be reacted with amines, aldehydes and/or phenols to form resins. Furthermore, materials containing both lignin and cellulose may be reacted without removing the cellulose to give resinous materials. A commercial lignin resin is used in this example which is heat reactive, heat hardenable and soluble in certain solvents. 130 lb. cylinder paper is coated with the following adhesive at the rate of 4½ lbs. per ream.

230 pts. pulverized heat reactive lignin resin dissolved in a mixture of
168 pts. furfural
112 pts. cresol Twenty pounds (20 lbs.) of 80 mesh fused alumina are distributed electrostatically on the adhesive-coated surface. After a short air drying, the abrasive coating is sized with a liquid adhesive consisting of 30 pts. of the former coating adhesive and 5 pts. water. The coated paper is cured at 150° F. for 18 hours, 225° F. for 3 hours and 300° F. for 4 hours in a well ventilated oven.

Lignin resins may also be employed in the manufacture of bonded abrasive articles such as abrasive wheels or stones. For example, we have successfully made abrasive wheels by first wetting abrasive grains with a liquid phenol-formaldehyde condensation product containing the lignin resin described in Example I, adding powdered phenol-aldehyde resin in the "A" stage, pressing in a mold, removing from the mold, and heating to harden the resin bond. Alternatively, a lignin resin or a lignin-containing powder may be mixed with powdered resin and employed in the process described in U. S. Patent #1,626,246.

The advantages of using these lignin adhesives are numerous. Lignin, being a very plentiful and cheap by-product, can be used in resinous adhesives to cheapen them so that they may compete favorably with the cheaper adhesives. Further, lignin by-products may be added to normally liquid phenolic resins to increase their stickiness and at the same time adjust their viscosity and air setting properties for proper coating qualities.

The cheap lignin products may be incorporated in resinous adhesives in numerous ways. Thermoplastic or heat hardenable lignin resins may be dissolved in suitable solvents. Lignin products, which may be derived from any of a number of sources, may be used as the sole adhesive or they may be incorporated with various other binders. Various fillers, plasticizers, catalysts, hardeners and insolubilizing agents may be present in the adhesive.

Although we have described certain specific embodiments of our invention, we are fully aware that many modifications thereof are possible. The invention, therefore, is not to be restricted except insofar as is necessitated by the prior art and by the scope of the appended claims.

We claim:

1. An abrasive coated article comprising a backing and abrasive grains attached thereto by a heat-hardened bond consisting principally of the reaction product of lignin, a phenol, and an aldehyde, containing not more than forty percent lignin.

2. An abrasive coated article comprising a backing and abrasive grains attached thereto by the heat-hardened reaction product of lignin and a phenol-aldehyde condensation product, the proportion of lignin in the bond being not over forty per cent.

3. An abrasive coated article comprising a backing and abrasive grains attached thereto by the heat-hardened reaction product of lignin and a phenol-formaldehyde condensation product, the proportion of lignin in the bond being not over forty percent.

RAYMOND C. BENNER.
NORMAN P. ROBIE.